(12) United States Patent
Madison et al.

(10) Patent No.: US 8,793,713 B2
(45) Date of Patent: Jul. 29, 2014

(54) ROTARY HEAD DATA STORAGE AND RETRIEVAL SYSTEM AND METHOD WITH TAPE MEDIUM HAVING TRANSVERSE PRIMARY DATA TRACKS AND LONGITUDINAL SECONDARY DATA TRACK

(71) Applicant: Oracle International Corporation, Redwood City, CA (US)

(72) Inventors: Carl Madison, Windsor, CO (US); Timothy C. Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/670,688

(22) Filed: Nov. 7, 2012

(65) Prior Publication Data
US 2014/0130067 A1    May 8, 2014

(51) Int. Cl.
G11B 7/007    (2006.01)
G11B 7/08    (2006.01)
G11B 7/14    (2012.01)

(52) U.S. Cl.
USPC .............................. 720/672; 360/84; 720/746

(58) Field of Classification Search
USPC ......... 360/77.12–77.17, 78.01–78.03, 82–87, 360/251–251.5, 241–241.2; 369/112.23, 369/112.24, 113–115; 720/662, 672–688, 720/746
See application file for complete search history.

(56) References Cited

U.S. PATENT DOCUMENTS

| | | |
|---|---|---|
| 2,866,012 A | 12/1958 | Ginsburg et al. |
| 4,970,707 A | 11/1990 | Hara et al. |
| 5,331,490 A | 7/1994 | Richards et al. |
| 5,343,338 A | 8/1994 | Murata et al. |
| 5,404,348 A | 4/1995 | Terao et al. |
| 5,450,228 A | 9/1995 | Boardman et al. |
| 5,465,243 A * | 11/1995 | Boardman et al. ......... 369/53.29 |
| 5,519,554 A | 5/1996 | Todd et al. |
| 5,585,978 A | 12/1996 | Rottenburg et al. |

(Continued)

FOREIGN PATENT DOCUMENTS

| | | |
|---|---|---|
| DE | 2022265 | 11/1971 |
| DE | 2203840 | 8/1973 |

(Continued)

OTHER PUBLICATIONS

English translation of JP 06290401 A.*

(Continued)

*Primary Examiner* — Nathan Danielsen
(74) *Attorney, Agent, or Firm* — Brooks Kushman P.C.

(57) ABSTRACT

A data storage and retrieval system includes a head carriage unit having multiple heads disposed at a working surface and a tape drive unit configured to move the tape past the working surface of the head carriage unit in a direction substantially parallel to a tape length. The heads are configured to write primary data tracks to or read primary data tracks from the tape as the head carriage unit rotates and the tape moves past the working surface, the primary data tracks having an arcuate shape and extending substantially along a tape width. The heads are also configured to write at least one secondary data track to or read at least one secondary data track from the tape as the head carriage unit rotates and the tape moves past the working surface, the at least one secondary data track extending substantially along the tape length.

20 Claims, 3 Drawing Sheets

(56) References Cited

U.S. PATENT DOCUMENTS

| | | |
|---|---|---|
| 5,646,806 A | 7/1997 | Griffith et al. |
| 5,883,868 A | 3/1999 | Iwanaga |
| 5,889,744 A | 3/1999 | Iwanaga |
| 5,953,482 A | 9/1999 | Suzuki et al. |
| 6,061,199 A | 5/2000 | Goker et al. |
| 6,075,678 A | 6/2000 | Saliba |
| 6,075,759 A * | 6/2000 | Yanagawa et al. ......... 369/44.18 |
| 6,088,183 A | 7/2000 | Nelson |
| 6,108,165 A | 8/2000 | Maruyama et al. |
| 6,141,312 A | 10/2000 | Masters et al. |
| 6,188,535 B1 | 2/2001 | Lemke et al. |
| 6,285,519 B1 | 9/2001 | Goker |
| 6,297,927 B1 | 10/2001 | Rudi |
| 6,304,397 B1 | 10/2001 | Ozue et al. |
| 6,442,126 B1 | 8/2002 | Marchant et al. |
| 6,614,731 B2 | 9/2003 | Ishii |
| 6,661,616 B2 | 12/2003 | Yasukochi |
| 6,856,484 B2 | 2/2005 | Johnson et al. |
| 6,940,682 B2 | 9/2005 | Bui et al. |
| 7,050,265 B2 | 5/2006 | Kondo et al. |
| 7,062,682 B2 | 6/2006 | Ozaki |
| 7,133,262 B1 | 11/2006 | Nayak |
| 7,324,297 B2 | 1/2008 | Evans et al. |
| 8,014,246 B2 | 9/2011 | Mahnad |
| 8,077,566 B2 | 12/2011 | Mahnad |
| 8,174,950 B2 | 5/2012 | Ritter et al. |
| 8,225,339 B1 | 7/2012 | Madison, Jr. et al. |
| 2003/0043498 A1 | 3/2003 | Johnson et al. |
| 2007/0047395 A1 | 3/2007 | Skeeter et al. |
| 2007/0143659 A1 | 6/2007 | Ball |
| 2007/0206477 A1 | 9/2007 | Raniuk et al. |
| 2007/0222096 A1 | 9/2007 | Slafer |
| 2011/0141863 A1 | 6/2011 | Mahnad |
| 2013/0235708 A1 | 9/2013 | Wilson |

FOREIGN PATENT DOCUMENTS

| | | | | |
|---|---|---|---|---|
| JP | 06290401 A | * | 10/1994 | ............. G11B 5/008 |
| JP | 07098828 A | * | 4/1995 | ............... G11B 5/56 |
| WO | 9202014 | | 2/1992 | |
| WO | WO 02/09099 | | 1/2002 | |
| WO | 2007092785 | | 8/2007 | |
| WO | 2007092785 A2 | | 8/2007 | |

OTHER PUBLICATIONS

English translation of JP 07098828 A.*
Final Office Action for U.S. Appl. No. 13/670,744 dated Sep. 5, 2013.
Quadruplex videotape, Wikipedia.org, Mar. 30, 2011, pp. 1-3.
Optical Disc Drive, Wikipedia.org, Mar. 30, 2011, pp. 1-4.
Helical scan, Wikipedia.org, Feb. 2, 2009, pp. 1-2.
Blu-ray disc, Wikipedia.org, Mar. 29, 2011, pp. 1-10.
International Search Report for PCT/US2012/041996 dated Oct. 25, 2012.
Office Action for U.S. Appl. No. 13/670,744 dated May 21, 2013.
Office Action for U.S. Appl. No. 13/670,712 dated Oct. 4, 2013.
Office Action for U.S. Appl. No. 13/622,607 dated Sep. 12, 2013.
Notice of Allowance for U.S. Appl. No. 13/670,744 dated Sep. 18, 2013.
European Patent Office, International Search Report and the Written Opinion for International Application No. PCT/US2013/068489 mailed Feb. 26, 2014.
European Patent Office, International Search Report and the Written Opinion for International Application No. PCT/US2013/068660 mailed Feb. 26, 2014.
Notice of Allowance for U.S. Appl. No. 13/670744 dated Mar. 19, 2014.
Office Action for U.S. Appl. No. 14/127,028 dated Apr. 7, 2014.
European Patent Office, The International Searching Authority, The International Search Report PCT/US2013/068660 mailed Feb. 25, 2014.
European Patent Office, The International Searching Authority, The International Search Report PCT/US2013/068489 mailed Feb. 26, 2014.
Final Office Action for U.S. Appl. No. 13/670,712 dated Apr. 25, 2014.
International Search Report and Written Opinion for International Application PCT/US2013/068646 dated Feb. 24, 2014 (13 pages total).
Office Action for U.S. Appl. No. 13/622,607 dated May 7, 2014.

* cited by examiner

ROTARY HEAD DATA STORAGE AND RETRIEVAL SYSTEM AND METHOD WITH TAPE MEDIUM HAVING TRANSVERSE PRIMARY DATA TRACKS AND LONGITUDINAL SECONDARY DATA TRACK

TECHNICAL FIELD

The following relates to a system and method for data storage and retrieval utilizing a rotary head and a tape medium having transverse primary data tracks and longitudinal secondary data tracks.

BACKGROUND

Typical tape data storage and retrieval methods involve recording or writing data in tracks running length-wise down the tape, as well as retrieving or reading such data tracks from the tape. A multiple stripe magnetic head is used to write and/or read many parallel tracks, with the ability to jog along the width of a magnetic tape to write and/or read more tracks. Optical tape data storage and retrieval systems using laser heads operate in a similar fashion.

Magnetic and optical tape media are frequently used for long-term storage of large quantities of data, such as in data backup or archive operations. However, the multiple stripe head designs mentioned above become inefficient as tape length is increased for greater capacity, such as in archive operations, because of the increased time it takes to access the data stored at the end of the tape. While shorter tapes result in quicker access time than longer tapes, shorter tape lengths also result in more limited storage capacity, thereby hindering archive operations where large data quantities are involved. A wide tape to boost capacity requires many more transducers in the head. Data throughput is also a factor of tape width and the number of heads. Limits to multiple stripe head designs include the number of read and write heads and overall tape width.

As noted, magnetic or optical heads write data in longitudinal tracks or series of spots running lengthwise down the tape media surface. Searching down the tape or "seeking" data is accomplished using indexing information which facilitates high-speed motion down the tape to get to data that has been listed in an index or meta-data section on the recorded media. Existing recording methods have inherent inefficiencies in how the seeking is done. Data can be accessed only by positioning the tape to a required section at high speed and then slowing the tape down for reading, which causes multiple seconds of delay.

Thus, there exists a need for an improved tape media data storage system and method. Such a system and method would include a rotary head design that would put more tape surface area in contact with the heads. A vast improvement in seek time, and improved seek time vs. data capacity would be achieved by using a rotating head which writes primary data in tracks running transverse to the length of a tape and simultaneously writes secondary tracks running longitudinally down the length of the tape for search indexing information, for example "data tags".

Using a tape having a greater width in proportion to tape length would enable a large amount of data to be stored in tracks across the tape while allowing additional search information to be written in one or more stripes lengthwise along one or both edges of the media. Such a system and method would also advantageously use the wide tape to provide an indexing scheme written longitudinally down the tape, which could be used for high-speed seek and/or search while skipping past the actual primary data tracks.

SUMMARY

According to one embodiment disclosed herein, a data storage and retrieval system is provided. The system comprises a head carriage unit having a plurality of optical heads disposed at a working surface. The head carriage unit is adapted for rotational motion. The system further comprises a tape drive unit for use in moving an optical tape media having a length and a width. The drive unit is configured to move the tape past the working surface of the head carriage unit in a direction substantially parallel to the length of the tape.

In this embodiment, the plurality of heads are configured to perform one of writing a plurality of primary data tracks to and reading a plurality of primary data tracks from the tape as the head carriage unit rotates and the tape moves past the working surface, each primary data track having an arcuate shape and extending substantially along the width of the tape. The plurality of heads are further configured to perform one of writing at least one secondary data track to and reading at least one secondary data track from the tape as the head carriage unit rotates and the tape moves past the working surface, the secondary data track extending substantially along the length of the tape.

According to another embodiment, data storage and retrieval system comprising a head carriage unit having a plurality of heads disposed at a working surface, the head carriage unit adapted for rotational motion. The system further comprises a tape drive unit for moving a tape media having a length and a width, the tape width approximately equal to a width of the working surface of the head carriage unit. The drive unit is configured to move the tape past the working surface of the head carriage unit in a direction substantially parallel to the length of the tape.

In this embodiment, the plurality of heads are configured to perform one of writing a plurality of primary data tracks to and reading a plurality of primary data tracks from the tape as the head carriage unit rotates and the tape moves past the working surface, each primary data track having an arcuate shape and extending substantially along the width of the tape. The plurality of heads are further configured to perform one of writing at least one secondary data track to and reading at least one secondary data track from the tape as the head carriage unit rotates and the tape moves past the working surface, the secondary data track extending substantially along the length of the tape.

According to another embodiment disclosed herein, a data storage and retrieval method is provided. The method comprises rotating a head carriage unit having a plurality of optical heads disposed at a working surface, and moving an optical tape media having a length and a width past the working surface of the head carriage unit in a direction substantially parallel to the length of the tape. The method also comprises using the plurality of optical heads to perform one of writing a plurality of primary data tracks to and reading a plurality of primary data tracks from the tape as the head carriage unit rotates and the tape moves past the working surface, each primary data track having an arcuate shape and extending substantially along the width of the tape. The method further comprises using the plurality of optical heads to perform one of writing at least one secondary data track to and reading at least one secondary data track from the tape as the head carriage unit rotates and the tape moves past the working surface, the secondary data track extending substantially along the length of the tape.

A detailed description of these embodiments and accompanying drawings is set forth below.

DETAILED DESCRIPTION

Figure 1:
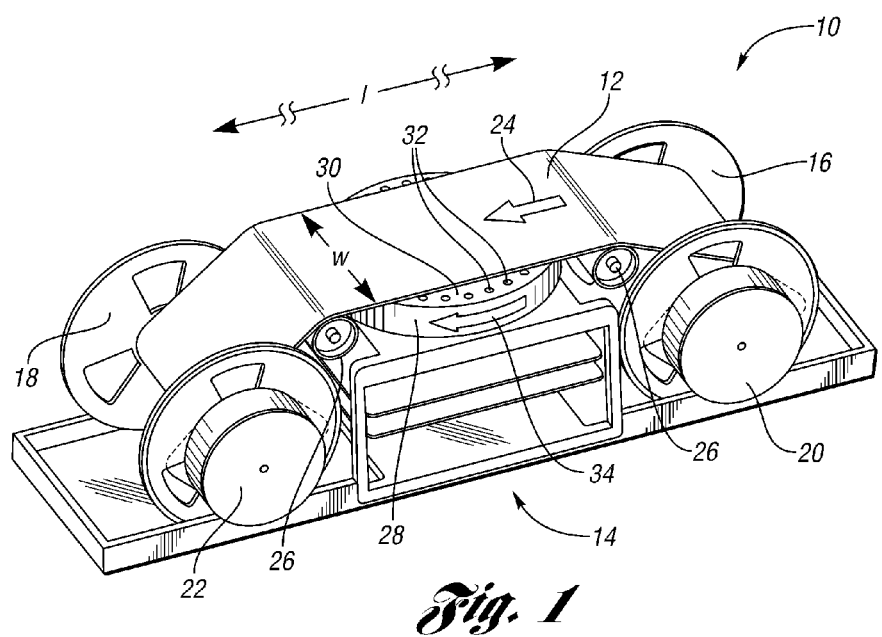
FIG. 1 is a perspective view of an embodiment of a rotary head data storage and retrieval system.

With reference to FIGS. 1-4, a data storage and retrieval system and method utilizing a tape media and a rotary head will be described. For ease of illustration and to facilitate understanding, like reference numerals have been used herein for similar components and features throughout the drawings.

As previously described, an improved tape media data storage system and method would include a rotary head design that would put more tape surface area in contact with the heads. A wide tape media provides a much greater tape surface area for a head, and achieves both high data capacity and fast access times. A head may be swept substantially perpendicularly across the tape width while the tape is moved longitudinally past the moving head. Multiple heads may be assembled to a rotating head mechanism to write and/or read multiple tracks in approximate arcs on the tape. The data storage system and method disclosed herein allow for a large tape surface in proximity to many high speed heads. Such a design results in improved performance in data rates and data capacity per inch of tape. The design facilitates shorter tapes for fast searches, or longer tapes for extremely large data banks.

As also previously noted, with typical data recording techniques, magnetic or optical heads write data in longitudinal tracks or series of spots running lengthwise down the tape media surface. Searching down the tape or "seeking" data is accomplished using indexing information which facilitates high-speed motion down the tape to get to data that has been listed in an index or meta-data section on the recorded media. Existing recording methods have inherent inefficiencies in how the seeking is done. Data can be accessed only by positioning the tape to a required section at high speed and then slowing the tape down for reading, which causes multiple seconds of delay.

A vast improvement in seek time and improved seek time versus data capacity may be achieved by using a rotating head which writes primary data in tracks running substantially transverse to a tape and simultaneously writes secondary tracks running substantially longitudinally down the tape for search indexing information, for example "data tags". A tape having a greater width in proportion to tape length enables a large amount of data to be stored in tracks across the tape width while allowing an additional portion of search information to be written in one or more stripes lengthwise along one or both edges of the tape. For example, a 4 inch wide tape may contain 8 times the information per foot of tape than the typical ½ inch wide tape. The system and method disclosed herein advantageously use the wide tape to provide an indexing scheme with indexing information written longitudinally down the tape, which can be used for high-speed seek and/or search while skipping past the large amounts of data stored on the primary tracks recorded across the tape width.

Referring now to FIG. 1, a perspective view is shown of a rotary head data storage and retrieval system with a tape medium. The tape drive system 10 comprises a tape media 12, which may be an optical tape, and a supporting servo drive system 14. The tape media 12 may be supplied on a supply reel 16 and can be transferred to a take-up reel 18 by servo action of a supply reel drive motor 20 and take-up reel drive motor 22. The two motors 20, 22 may act in unison to provide smooth movement of the tape 12 along a tape path in a direction shown by arrow 24.

As can be seen in FIG. 1, the tape media 12 has a width (w), as well as a length (l) stretching from respective ends of the tape 12, which ends are attached (not shown) to the supply and take-up reels 16, 18. The tape path has a series of guide rollers 26, which help to provide control of the tape 12 as it is driven past a head assembly 28. A servo control system (not shown) may be used to provide closed loop motion control for the tape 12 and accurately control tension and position of the tape 12 with respect to the head assembly 28.

As also seen in FIG. 1, the head assembly 28 may be substantially disc-shaped, and may include a substantially circular and substantially planar working surface 30 proximate the tape media 12. The head assembly 28 may include multiple heads 32 for recording and/or reading data to and/or from the tape media 12. In that regard, the head assembly 28 rotates during operation in a direction shown by arrow 34 as the tape media 12 moves in a direction shown by arrow 24. The rotary head data storage and retrieval system of FIG. 1 is further described, together with additional features, components, operations, functions and methods, in U.S. Pat. No. 8,225,339 and U.S. patent application Ser. No. 13/622,607, the disclosures of which are incorporated herein by reference in their entireties.

Figure 2:
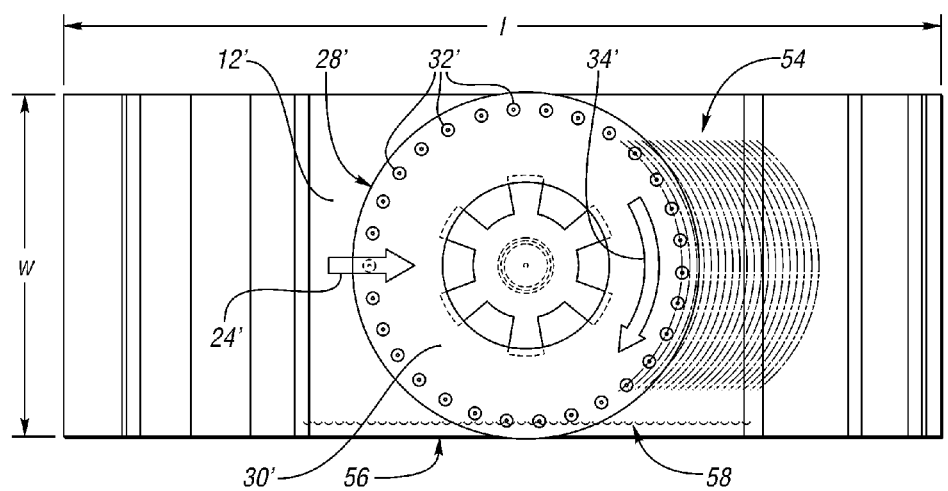
FIG. 2 is a top view of an embodiment of a data storage and retrieval system disclosed herein.
Figure 3:
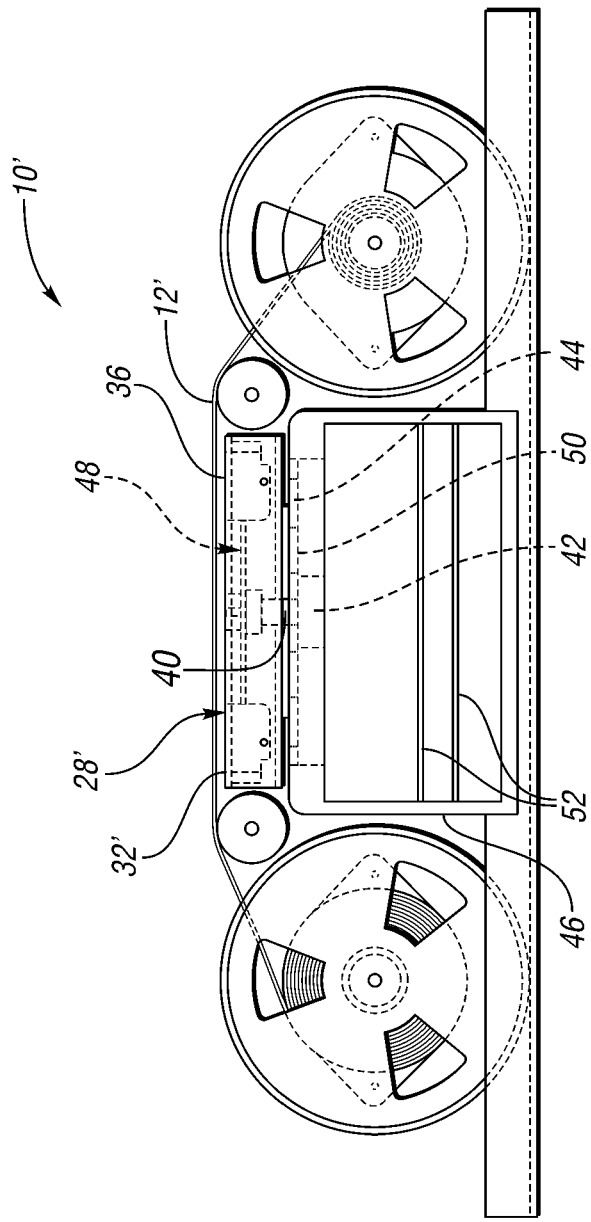
FIG. 3 is a side view of an embodiment of a data storage and retrieval system disclosed herein.

Referring next to FIGS. 2 and 3, top and side views of an embodiment of the data storage and retrieval system 10' disclosed herein are shown. As seen in particular in FIG. 3, a head assembly 28' may be built upon a head carriage unit 36. The carriage 36 may hold multiple Optical Pickup Unit (OPU) laser assemblies 32', which perform the actual writing/reading or recording/retrieval of data to/from an optical tape 12'. While a particular number of OPU assemblies 32' are illustrated in FIG. 2, any number of OPUs 32' may be used.

As seen in FIG. 2, the OPU assemblies 32' may be located radially on the rotating head carriage 28' at a fixed radius in a substantially circular pattern. Such positioning of the OPU assemblies 32' can ensure that as the head assembly 28' rotates in the direction shown by arrow 34' and the tape 12' moves in the direction shown by arrow 24', the optical beams from each OPU 32' transcribe substantially equal radius arcs onto the tape media 12'.

As seen in FIG. 3, the rotatable head assembly 28' may be mounted underneath the tape media 12'. A spindle shaft 40 may be provided for support of the rotatable head assembly 28'. The head assembly 28' may be driven to rotate by a head drive motor 42, which may built into the head assembly 28'. In that regard, passive rotor magnets 44 associated with the rotating head assembly 28' may be driven by commutation of stator coils (not shown) fixed in the tape drive base 46.

Still Referring to FIG. 3, a head assembly circuit board 48 may be provided to control the function of OPU assemblies 32', as well as data communication. Power may be supplied to the head circuitry 48 through an inductive coupling 50. Data signals to and from the OPU assemblies 32' may be sent through the inductive coupling 50. Motor control and further data signal processing may be performed by circuit boards 52, which may be located in the tape drive base 46.

Referring again to FIG. 2, the path of tape media 12' over the head assembly 28' is illustrated. As previously described, the tape media 12' may pass over the head assembly 28' in the direction shown by arrow 24'. The head assembly 28' also rotates as illustrated by arrow 34'. The passage of each OPU 32' past the tape media 12' as the tape media 12' moves in the direction of arrow 24' and the head assembly 28' rotates in the direction of arrow 34' results in data tracks of recorded spots which may be transcribed in substantially similar approximate arcs 54 on the tape media 12'. The arcs 54 are only approximate in radius in that the movement of the tape media 12' past the heads 38 will skew the data tracks recorded from true arcs to elongated arcs 54 in proportion to the speed of the rotating heads and the speed of the moving tape 12'.

A servo control method and system (not shown) may also be provided to control the speed of the tape media 12' in such a way that the rotating laser spots from OPU assemblies 38 will individually write data tracks 54 with spacing set apart from one another as a function of the velocities of the tape media 12 and the rotating head assembly 28'. In that regard, the relative speeds between tape media 12' and head assembly 28' can be large, with the speed of the head assembly 28' emulating the recording speed of a Blu-Ray DVD, while the speed of the tape media 12' can be quite slow. As a result, by moving both the tape media 12' and the recording heads 32', the data storage system and method disclosed herein having a rotating head assembly 28' may provide for very high data rates and very large storage capacity.

As previously noted, the head carriage assembly 28' may be substantially disc-shaped, and may include a substantially circular and substantially planar working surface 30' proximate the tape media 12'. It should be noted, however, that the head assembly 28' and working surface 30' may have different shapes and/or configurations. As well, OPU assemblies 32' may comprise servo subsystems for controlling movement of the OPUs 32' relative to the tape medium 12' and the head carriage assembly 28', including radial movement of the OPUs 32' at the working surface 30' of the head carriage assembly 28'.

Referring now to FIG. 2, the rotating heads 32' of the system 10' and method disclosed herein write data in "arcs" or arcuate primary data tracks 54 substantially transverse to the length (l) of the tape 12'. Each head 32' may be idle for a certain portion of the rotational period, and also over a portion of the tape media 12' which is not used for primary data. By utilizing this idle portion of the rotation to write further information to the tape media 12', the rotating heads 32' may be used to accomplish indexing tasks in the background or in parallel to data recording in the primary data tracks 54 without impacting system performance or write speeds.

More specifically, the arcs transcribed across the width (w) of the tape media 12' by the rotation of the heads 32' in rotary recording on the moving media 12' are actually stretched slightly along the tape 12' because the tape 12' must be moving slightly under the heads 32' to get space between each arc. The arc length for each primary data track 54 written from the pass of a head 32' over the tape 12' is designed to be shorter than a full 180° arc so that the ends of the arcuate data track 54 do not come close to the adjacent arcuate data tracks 54 in the recording process.

According to embodiments of the system 10' and method disclosed herein, the tape 12' may be designed slightly wider than the arcs that can be traced by the rotating heads 32', thereby allowing a side-band of the tape media 12' to be used for search/seek information. More particularly, the side-band of the media 12' may coincide with a portion of the rotation of a head 32' where the head 32' is traveling near an edge 56 of the tape 12' and substantially parallel to the direction of the movement of the tape 12' shown by arrow 24'. In such a fashion, secondary data may be written in one or more secondary data tracks 58 along the length (l) of the tape 12'. In that regard, it should be noted that while the secondary data track or tracks 58 may trace an overall path along the tape 12' that is substantially straight or longitudinal along the length (l) of the tape 12', such a secondary track or tracks 58 may comprise a plurality of relatively short arcuate data tracks each recorded as a head 32' is activated for writing during a short period of time while passing along the edge 56 of the tape 12'. In an alternative embodiment, a parked rotating head 32' or a separate fixed position head (not shown) may be used to access or read data recorded n the secondary track or tracks 58.

As noted previously, typical data tape recording devices utilize a search-and-seek strategy based on indexing marks along the tape media in conjunction with file management information in header regions of the tape. Such a strategy results in performance problems. Searching for files and seeking information down the tape can only be accomplished as fast as the tape can travel. What is needed is a way to search and seek information that is not as dependent on tape speed.

The two-dimensional data recording of the system 10 and method disclosed herein eliminates the dependency on tape speed by providing two different data structures on the same media. One data structure, the primary data structure, is recorded laterally across the width (w) of the tape 12' in arcuate primary data tracks 54. Another data structure, the secondary data structure, is recorded longitudinally down the length (l) of the tape 12' in one or more secondary data tracks 58. As a result, the primary data size and rate are proportional to the width (w) of the tape 12' and the secondary data size and rate are proportional to the length (l) and speed of the tape 12'.

In such a fashion, searching large amounts of data stored on a wide tape may be accomplished quickly. Without indexing information stored in one or more secondary data tracks 58 according the system 10' and method disclosed, a wide tape 12' utilizing a rotating head would only allow for searching and seeking at the speed for reading the primary data tracks 54, which is the linear speed of the tape (e.g., ⅛ inch/sec). With such indexing information stored in such secondary tracks 58, however, the secondary data can be utilized at a linear tape speed much higher (e.g., 10 m/sec) than the tape speed for the primary data. The result is an improvement in search/seek operations of about 8 times over normal ½ inch tape, when compared at the same tape speeds and at single optical media layers.

Referring again to FIGS. 2 and 3, the data storage and retrieval system 10' may comprise a head carriage unit 28' adapted for rotational motion and having a plurality of heads 32' disposed at a working surface 30'. The system 10' may further comprise a tape drive unit for moving a tape media 12' having a length (l) and a width (w). The tape width (w) may be approximately equal to a width of the working surface 30' of the head carriage unit 28'. The drive unit may be configured to move the tape 12' past the working surface 30' of the head carriage unit 28' in a direction 24' substantially parallel to the length (l) of the tape 12'.

The plurality of heads 32' may be configured to perform writing and/or reading a plurality of primary data tracks 54 to/from the tape 12' as the head carriage unit 28' rotates and the tape 12' moves past the working surface 30' such that the primary data tracks 54 have an arcuate shape and extend substantially along the width (w) of the tape 12'. The plurality of heads may further be configured to perform writing and/or reading one or more secondary data tracks 58 to/from the tape 12' as the head carriage unit 28' rotates and the tape 12' moves past the working surface 30' such that the secondary data track or tracks 58 extend substantially along the length (l) of the tape 12'.

As previously described, the plurality of heads 32' may comprise optical heads and the tape media 12' may comprise optical tape. The head carriage unit 28' may be substantially disc shaped, the working surface 30' may be substantially circular, and the tape width (w) may be approximately equal to a diameter of the substantially circular working surface 30'. The plurality of heads 32' disposed at the working surface 30' may be arrayed substantially in a circle, and the tape width (w) may be greater than the diameter of the circle of the plurality of heads 32'.

As also previously described, at least one of the plurality of heads 32' may be configured to read the secondary data track or tracks 58 when the head carriage unit 28' is stationary and the tape 12' moves past the working surface 30'. Alternatively, a fixed position head may be provided and configured to read the secondary data track or tracks 58 when the tape 12' moves past the working surface 30' of the head carriage unit 28'. The secondary data track or tracks 58 may comprise a plurality of arcuate portions having data for use in indexing data of the plurality of primary data tracks 54.

Figure 4:
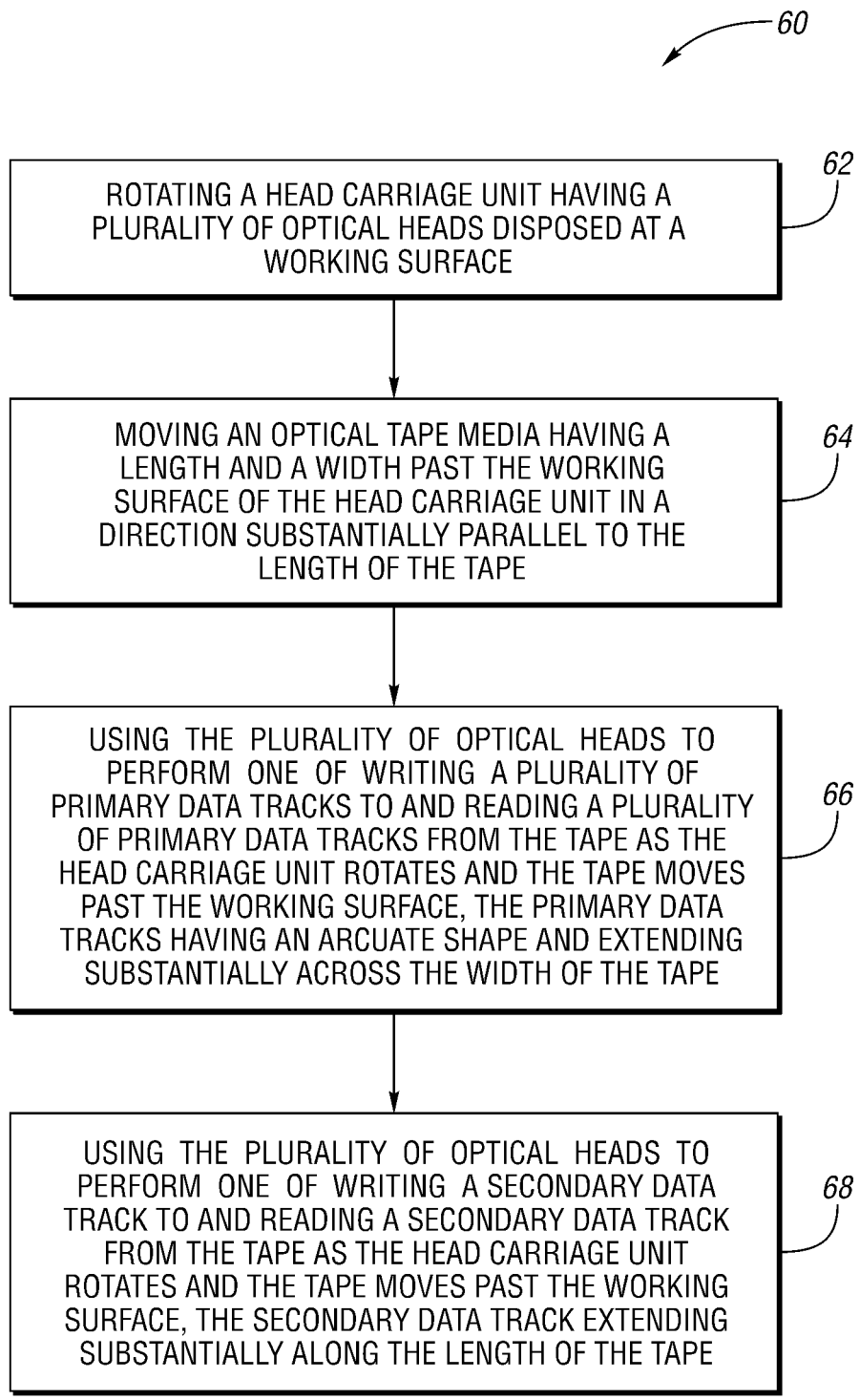
FIG. 4 is a simplified flowchart depicting an embodiment of a data storage and retrieval method disclosed herein.

Referring next to FIG. 4, simplified flowchart of an embodiment of the data storage and retrieval method 60 disclosed herein is shown. As seen therein, the method 60 may comprise rotating 62 a head carriage unit having a plurality of optical heads disposed at a working surface, and moving 64 an optical tape media having a length and a width past the working surface of the head carriage unit in a direction substantially parallel to the length of the tape.

The method 60 may further comprise using 66 the plurality of optical heads to perform writing and/or reading a plurality of primary data tracks to/from the tape as the head carriage unit rotates and the tape moves past the working surface, where the primary data tracks have an arcuate shape and extend substantially along the width of the tape. The method 60 may still further comprise using 68 the plurality of optical heads to perform writing and/or reading a secondary data track from the tape as the head carriage unit rotates and the tape moves past the working surface, where the secondary data track extends substantially along the length of the tape.

Once again, as described previously in connection with FIGS. 2 and 3, according to embodiments of the data storage method 60 disclosed herein, the plurality of heads 32' may comprise optical heads and the tape media 12' may comprise optical tape. The head carriage unit 28' may be substantially disc shaped, the working surface 30' may be substantially circular, and the tape width (w) may be approximately equal to a diameter of the substantially circular working surface 30'. The plurality of heads 32' disposed at the working surface 30' may be arrayed substantially in a circle, and the tape width (w) may be greater than the diameter of the circle of the plurality of heads 32'.

As also described above in connection with FIGS. 2 and 3, according to embodiments of the data storage method 60 disclosed herein, at least one of the plurality of heads 32' may be configured to read the secondary data track or tracks 58 when the head carriage unit 28' is stationary and the tape 12' moves past the working surface 30'. Alternatively, a fixed position head may be provided and configured to read the secondary data track or tracks 58 when the tape 12' moves past the working surface 30' of the head carriage unit 28'. The secondary data track or tracks 58 may comprise a plurality of arcuate portions having data for use in indexing data of the plurality of primary data tracks 54.

As is apparent from the foregoing description, an improved tape media data storage and retrieval system and method having a rotary head design is provided. The system and method disclosed provide vast improvement in seek time and improved seek time versus data capacity by using rotating heads to write primary data in tracks running substantially across the tape width and to simultaneously write secondary data tracks running substantially longitudinally down the tape for search indexing information. In such a fashion, the system and method disclosed herein advantageously use a wide tape and provide an indexing scheme with indexing information written longitudinally down the tape length, which can be used for high-speed seek and/or search operations while skipping past the large amounts of data stored on primary tracks recorded across the tape width.

While certain embodiments of a rotary head data storage and retrieval system and method utilizing a tape media have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A data storage and retrieval system comprising:
    a head carriage unit having a plurality of heads disposed at a working surface, the head carriage unit adapted for rotational motion; and
    a tape drive unit for moving a tape media having a length and a width, the drive unit configured to move the tape past the working surface of the head carriage unit in a direction substantially parallel to the length of the tape;
    wherein the plurality of heads are configured to write a plurality of primary data tracks to and/or read a plurality of primary data tracks from the tape when the head carriage unit rotates and the tape moves past the working surface, each primary data track having an arcuate shape and extending substantially along the width of the tape, and wherein the plurality of heads are configured to write at least one secondary data track to and/or read at least one secondary data track from the tape when the head carriage unit rotates and the tape moves past the working surface, the at least one secondary data track extending substantially along the length of the tape, and the at least one secondary data track comprising a plurality of arcuate portions having data for use in indexing data of the plurality of primary data tracks.

2. The system of claim 1 wherein the head carriage unit is substantially disc shaped, the working surface is substantially circular, and the tape width is approximately equal to a diameter of the substantially circular working surface.

3. The system of claim 2 wherein the plurality of heads disposed at the working surface are arrayed substantially in a circle.

4. The system of claim 3 wherein the tape width is greater than a diameter of the circle of the plurality of heads.

5. The system of claim 1 wherein at least one of the plurality of heads is configured to read the secondary data track when the head carriage unit is stationary and the tape moves past the working surface.

6. The system of claim 1 further comprising a fixed position head configured to read the secondary data track when the tape moves past the working surface of the head carriage unit.

7. A data storage and retrieval system comprising:
- a head carriage unit having a plurality of heads disposed at a working surface, the head carriage unit adapted for rotational motion, wherein the head carriage unit is substantially disc shaped and the working surface is substantially circular; and
- a tape drive unit for moving a tape media having a length and a width, the tape width approximately equal to a diameter of the working surface of the head carriage unit, the drive unit configured to move the tape past the working surface of the head carriage unit in a direction substantially parallel to the length of the tape;
- wherein the plurality of heads disposed at the working surface are arrayed substantially in a circle, the plurality of heads are configured to write a plurality of primary data tracks to and/or read a plurality of primary data tracks from the tape when the head carriage unit rotates and the tape moves past the working surface, the primary data tracks having an arcuate shape and extending substantially along the width of the tape, and wherein the plurality of heads are configured to perform writing at least one secondary data track to and/or reading at least one secondary data track from the tape when the head carriage unit rotates and the tape moves past the working surface, the at least one secondary data track extending substantially along the length of the tape.

8. The system of claim 7 wherein the plurality of heads comprise optical heads and the tape media comprises optical tape.

9. The system of claim 7 wherein the tape width is greater than a diameter of the circle of the plurality of heads.

10. The system of claim 7 wherein at least one of the plurality of heads is configured to read the secondary data track when the head carriage unit is stationary and the tape moves past the working surface.

11. The system of claim 7 further comprising a fixed position head configured to read the secondary data track when the tape moves past the working surface of the head carriage unit.

12. The system of claim 7 wherein the at least one secondary data track comprises a plurality of arcuate portions having data for use in indexing data of the plurality of primary data tracks.

13. A data storage and retrieval method comprising:
- rotating a head carriage unit having a plurality of heads disposed at a working surface;
- moving a tape media having a length and a width past the working surface of the head carriage unit in a direction substantially parallel to the length of the tape;
- using the plurality of heads to write a plurality of primary data tracks to and/or read a plurality of primary data tracks from the tape when the head carriage unit rotates and the tape moves past the working surface, the primary data tracks having an arcuate shape and extending substantially across the width of the tape; and
- using the plurality of heads to write at least one secondary data track to and/or read at least one secondary data track from the tape when the head carriage unit rotates and the tape moves past the working surface, the at least one secondary data track extending substantially along the length of the tape, and the at least one secondary data track comprising a plurality of arcuate portions having data for use in indexing data of the plurality of primary data tracks.

14. The method of claim 13 wherein the head carriage unit is substantially disc shaped, the working surface is substantially circular, and the tape width is approximately equal to a diameter of the substantially circular working surface.

15. The method of claim 14 wherein the plurality of heads disposed at the working surface are arrayed substantially in a circle, and the tape width is greater than a diameter of the circle of the plurality of heads.

16. The method of claim 13 wherein at least one of the plurality of heads is configured to read the secondary data track when the head carriage unit is stationary and the tape moves past the working surface.

17. The method of claim 13 further comprising a fixed position head configured to read the secondary data track when the tape moves past the working surface of the head carriage unit.

18. A data storage and retrieval system comprising:
- a head carriage unit having a plurality of heads disposed at a working surface, the head carriage unit adapted for rotational motion; and
- a tape drive unit for moving a tape media having a length and a width, the drive unit configured to move the tape past the working surface of the head carriage unit in a direction substantially parallel to the length of the tape;
- wherein the plurality of heads are configured to write a plurality of primary data tracks to and/or read a plurality of primary data tracks from the tape when the head carriage unit rotates and the tape moves past the working surface, each primary data track having an arcuate shape and extending substantially along the width of the tape, and wherein the plurality of heads are configured to write at least one secondary data track to and/or read at least one secondary data track from the tape as the head carriage unit rotates and the tape moves past the working surface, the at least one secondary data track extending substantially along the length of the tape, and at least one of the plurality of heads is configured to read the at least one secondary data track when the head carriage unit is stationary and the tape moves past the working surface.

19. A data storage and retrieval method comprising:
- rotating a head carriage unit having a plurality of heads disposed at a working surface, wherein the head carriage unit is substantially disc shaped, the working surface is substantially circular, and the plurality of heads disposed at the working surface are arrayed substantially in a circle;
- moving a tape media having a length and a width past the working surface of the head carriage unit in a direction substantially parallel to the length of the tape, wherein the tape width is greater than a diameter of the circle of the plurality of heads and the tape width is approximately equal to a diameter of the substantially circular working surface;
- using the plurality of heads to write a plurality of primary data tracks to and/or read a plurality of primary data tracks from the tape when the head carriage unit rotates and the tape moves past the working surface, the primary data tracks having an arcuate shape and extending substantially across the width of the tape; and
- using the plurality of heads to write at least one secondary data track to and/or read at least one secondary data track from the tape as the head carriage unit rotates and the tape moves past the working surface, the secondary data track extending substantially along the length of the tape.

20. A data storage and retrieval method comprising:
- rotating a head carriage unit having a plurality of heads disposed at a working surface;

moving a tape media having a length and a width past the working surface of the head carriage unit in a direction substantially parallel to the length of the tape;

using the plurality of heads to write a plurality of primary data tracks to and/or read a plurality of primary data tracks from the tape when the head carriage unit rotates and the tape moves past the working surface, the primary data tracks having an arcuate shape and extending substantially across the width of the tape; and using the plurality of heads to write at least one secondary data track to and/or read at least one secondary data track from the tape when the head carriage unit rotates and the tape moves past the working surface, the secondary data track extending substantially along the length of the tape;

wherein at least one of the plurality of heads is configured to read the secondary data track when the head carriage unit is stationary and the tape moves past the working surface.

* * * * *

UNITED STATES PATENT AND TRADEMARK OFFICE
CERTIFICATE OF CORRECTION

PATENT NO. : 8,793,713 B2
APPLICATION NO. : 13/670688
DATED : July 29, 2014
INVENTOR(S) : Madison et al.

Page 1 of 1

It is certified that error appears in the above-identified patent and that said Letters Patent is hereby corrected as shown below:

On title page 2, column 2, References Cited under Other Publications, line 24, after "Report" insert -- for --.

On title page 2, column 2, References Cited under Other Publications, line 27, after "Report" insert -- for --.

In the Specification

In column 6, line 16, delete "n" and insert -- in --, therefor.

In column 7, line 45, delete "tape" and insert -- tape. --, therefor.

Signed and Sealed this
Tenth Day of March, 2015

Michelle K. Lee
*Deputy Director of the United States Patent and Trademark Office*